(12) United States Patent
Liu et al.

(10) Patent No.: US 7,702,747 B1
(45) Date of Patent: Apr. 20, 2010

(54) IDENTITY SYNCHRONIZATION ACROSS MULTIPLE DOMAINS

(75) Inventors: Lei Liu, San Jose, CA (US); Guanghwa Ho, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 974 days.

(21) Appl. No.: 11/444,552

(22) Filed: May 31, 2006

(51) Int. Cl.
*G06F 15/16* (2006.01)
*G06F 7/00* (2006.01)

(52) U.S. Cl. .................. 709/217; 707/101; 709/205; 709/206

(58) Field of Classification Search .................. None
See application file for complete search history.

(56) References Cited

U.S. PATENT DOCUMENTS

| | | | |
|---|---|---|---|
| 5,933,837 A * | 8/1999 | Kung | 707/101 |
| 6,792,431 B2 * | 9/2004 | Tamboli et al. | 707/102 |
| 2001/0056469 A1 * | 12/2001 | Oonuki | 709/206 |
| 2002/0052921 A1 * | 5/2002 | Morkel | 709/206 |
| 2004/0260715 A1 * | 12/2004 | Mongeon et al. | 707/101 |
| 2005/0021567 A1 * | 1/2005 | Holenstein et al. | 707/200 |
| 2005/0050068 A1 * | 3/2005 | Vaschillo et al. | 707/100 |
| 2006/0230124 A1 * | 10/2006 | Belfiore et al. | 709/219 |

\* cited by examiner

*Primary Examiner*—Joseph E Avellino
*Assistant Examiner*—Dung Huynh
(74) *Attorney, Agent, or Firm*—Osha • Liang LLP (57) ABSTRACT

A method for identity synchronization across multiple domains includes obtaining identity data from a source channel, wherein the identity data is associated with a source channel protocol, decoupling the identity data from the source channel protocol to obtain decoupled identity data, creating a normalized event object using the decoupled identity data, placing the normalized event object into an event bus, coupling the normalized event object with a target channel protocol to create a target-specific change object for a target channel, and forwarding the target-specific change object to the target channel.

15 Claims, 6 Drawing Sheets

IDENTITY SYNCHRONIZATION ACROSS MULTIPLE DOMAINS

BACKGROUND

Modern enterprise applications employ a multitude of Information Technology (IT) systems, including network operating systems, a range of servers, user directories, human resources, payroll and management systems, line-of-business applications, customer relationship management systems, and electronic commerce applications. In addition, a variety of users access these systems, such as administrators, employees, contractors, partners, vendors, and customers. Almost every system must track valid users and control their access privileges to various parts of the enterprise application. For example, an administrator may have access to all levels of the enterprise system, including databases containing sensitive information about other users, but a customer may only have permission to access a few systems, such as customer relationship management and e-Commerce.

Because enterprise applications have become increasingly distributed and complex, organizations often use identity management systems to facilitate services such as user authentication, access rights, access restrictions, account profiles, and passwords. Identity management systems consolidate and streamline the management of user identity information across the life cycle of an identity profile, which includes initial setup, change and maintenance, and tear down. Initial setup occurs when a new user joins an organization and requires timely and accurate entry of data across multiple systems. Change and maintenance are performed during the lifetime of the identity profile and may involve routine password changes, name and profile changes, adding and removing individual login accounts, and changing privileges on existing accounts. Tear down is performed when a user leaves the organization and typically involves flagging the identity profile and disabling the identity profile's access to systems.

Challenges in identity management include consistency, efficiency, usability, and reliability. To achieve consistency, an identity management system must synchronize identity data reliably amongst multiple systems. Efficiency is hindered because access to multiple systems by a single profile must be enabled with the tools provided at each system instead of a single interface. Usability is diminished when access to multiple systems requires multiple login IDs, multiple passwords, and multiple sign-on screens. Reliability refers to the complete, timely, and accurate production of identity data on every system and is especially important when the identity data is used to control access to sensitive information or resources.

Several technologies currently exist for identity management in enterprise applications. Directories, which may be stored on one or more directory servers and accessed by protocols such as Lightweight Directory Access Protocol (LDAP) and X.500, consolidate the management of data about users as well as other objects in the enterprise application, including user groups, servers, printers, etc. Web access management (WAM) tools allow users to be authenticated once and maintain the authentication state as the users navigate between applications. WAM systems may also define user groups and assign access privileges to users on the managed systems. Legacy single sign-on, or SSO, systems give users a client-side master system to sign onto while storing users' logins and passwords to every supported application. When a user launches an application through the SSO software, the SSO software opens the appropriate program and sends the appropriate login and password to that program for the user. SSO access requests are authenticated by an SSO-Token validation process. If a user cannot provide a valid SSOToken, the access request is denied and the user is prompted for login credentials before opening any SSO applications.

SUMMARY

In general, in one aspect, embodiments of the invention relate to a method for identity synchronization across multiple domains, comprising obtaining identity data from a source channel, wherein the identity data is associated with a source channel protocol, decoupling the identity data from the source channel protocol to obtain decoupled identity data, creating a normalized event object using the decoupled identity data, placing the normalized event object into an event bus, coupling the normalized event object with a target channel protocol to create a target-specific change object for a target channel, and forwarding the target-specific change object to the target channel.

In general, in one aspect, embodiments of the invention relate to a system for synchronizing identities across multiple domains, comprising a source channel, wherein the source channel is associated with a source channel protocol, a plurality of target channels, wherein each of the plurality of target channels is associated with a target channel protocol, a normalization layer configured to decouple identity data from the source channel protocol and create normalized event objects using the decoupled identity data, an event bus configured to store the normalized event objects created from the normalization layer, and a data transformation layer configured to couple decoupled identity data in the normalized event objects with the target channel protocols.

In general, in one aspect, the invention relates to a computer usable medium having computer readable program code embodied therein for causing a computer system for executing a method for identity synchronization across multiple domains, comprising obtaining identity data from a source channel, wherein the identity data is associated with a source channel protocol, decoupling the identity data from the source channel protocol to obtain decoupled identity data, creating a normalized event object using the decoupled identity data, placing the normalized event object into an event bus, coupling the normalized event object with a target channel protocol to create a target-specific change object for a target channel, and forwarding the target-specific change object to the target channel.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for synchronization of identity data across multiple domains. These domains may include LDAP directory servers, web access management systems, extensible markup language (XML) specifications, relational databases, etc. Because these domains involve different implementation technologies and schema designs, synchronization between domains is often time-consuming and requires custom coding.

Specifically, embodiments of the invention complement existing identity management systems by providing a centralized identity synchronization service that transmits changes from arbitrary source identity data (ID) repositories to arbitrary target ID repositories. Because ID repositories tend to be protocol-specific, embodiments of the invention employ methods for obtaining ID from a source ID repository associated with a source protocol, stripping the source protocol from the ID to create a normalized event object, and coupling the normalized event object with one or more target protocols so that the ID may be appropriately and accurately conveyed to target ID repositories associated with the target protocols. ID repositories may include existing identity management solutions, which are then tied together by the invention. Embodiments of the invention may also be implemented on a distributed parallel system to attain high throughput, improved scalability, and greater availability.

Figure 1:
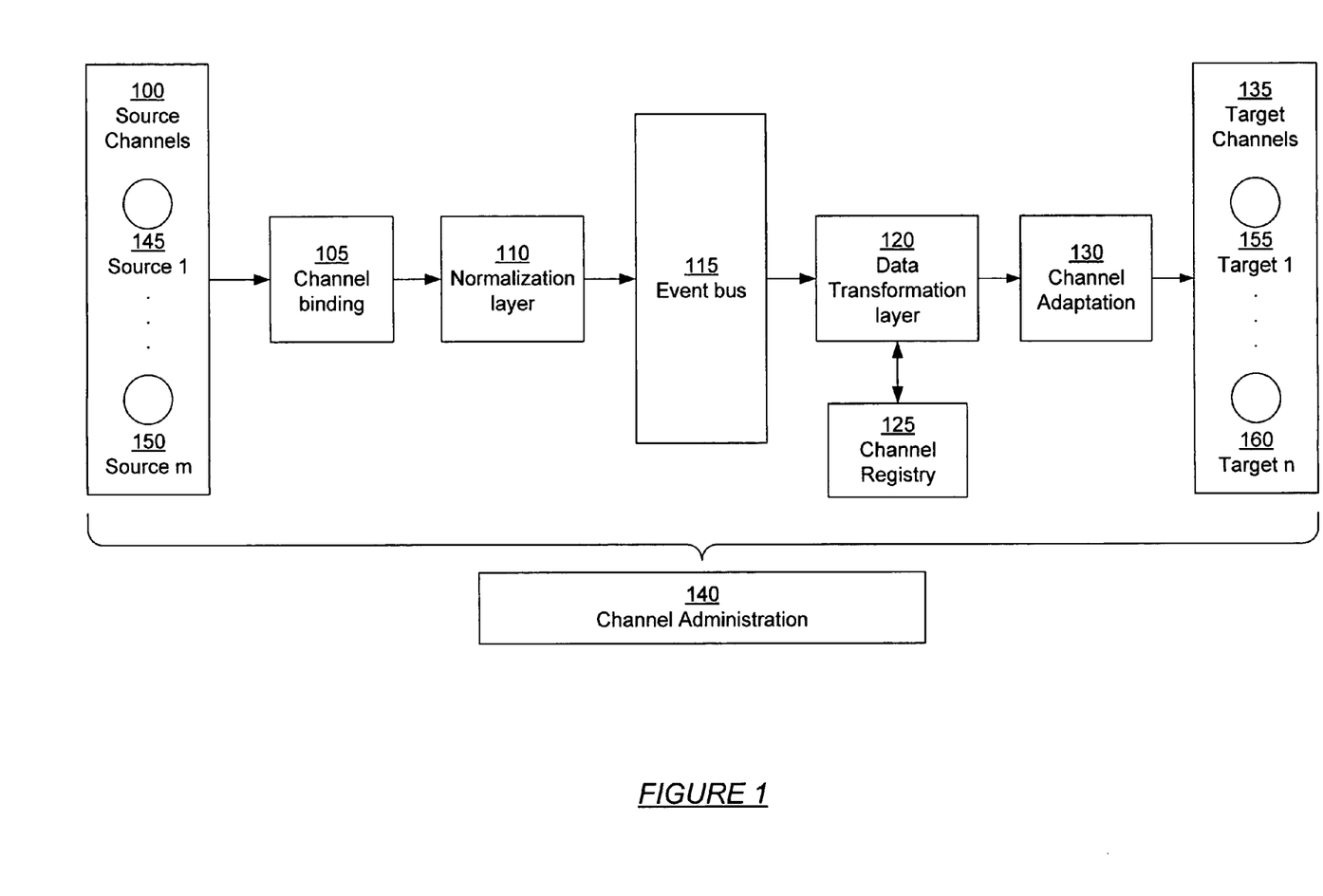
FIGS. 1-4 show schematic diagrams in accordance with one or more embodiments of the invention.

FIG. 1 shows a schematic diagram of a system in accordance with one or more embodiments of the invention. As shown in FIG. 1, the system includes source channels (100), a channel binding module (105), a normalization layer (110), an event bus (115), a data transformation layer (120), a channel registry (125), a channel adaptation module (130), target channels (135), and a channel administration module (140). Each of these components is described below.

Identity data is stored on one or more source channels (100) (e.g., source channel 1 (145), source channel m (150)) and one or more target channels (135) (e.g., target channel 1 (155), target channel n (160)). Changes in identity data, such as addition, deletion, and updates, occur in source channels (100) (e.g., source channel 1 (145), source channel m (150)) and are propagated to one or more target channels (135) (e.g., target channel 1 (155), target channel n (160)). In one or more embodiments of the invention, a channel relates to an ID repository, such as an LDAP directory server or relational database. In addition, each channel is associated with a channel protocol (not shown), which governs the representation and transmission of identity data from that channel. Those skilled in the art will appreciate that while channels may be distributed over a network, a single host on the network may contain multiple channels. For example, a host may contain both a web access management system and a directory. Further, those skilled in the art will appreciate that a channel may be both a source channel (e.g., source channel 1 (145), source channel m (150)) and a target channel (e.g., target channel 1 (155), target channel n (160)). For example, a SQL database may serve as a target channel when a user updates identity information through a Java™ 2 Enterprise Edition (J2EE™) application, or the database may serve as a source channel when an administrator manually deletes a database entry using a SQL query. (Java and J2EE are trademarks of Sun Microsystems)

Once a change in identity data is detected in a source channel (e.g., source channel 1 (145), source channel m (150)), the change in identity data is passed to the channel binding module (105), which contains channel listener threads (see FIG. 2) corresponding to source channels (e.g., source channel 1 (145), source channel m (150)). In one or more embodiments of the invention, a channel listener thread is assigned a specific source channel (e.g., source channel 1 (145), source channel m (150)) and is responsible for detecting and obtaining identity data changes in the source channel (e.g., source channel 1 (145), source channel m (150)).

Once a channel listener thread has obtained a change in identity data, the change in identity data is passed to the normalization layer (110). In one embodiment of the invention, the normalization layer (110) decouples the change in identity data from the source channel protocol associated with the change in identity data to create a normalized event object (not shown), which is protocol-agnostic. In one or more embodiments of the invention, the normalized event object is an internalized representation of a change in identity data containing attributes such as the type of change (e.g., add, delete, or update), a generic field corresponding to the change, and the new value of the changed field. For example, if a user corresponding to a unique ID of 1274904 updates his middle initial to "M", the normalized event object may contain the following elements:

change_type=update
changed_field="user MI"
changed_field_value="M"
UID=1274904

Once the normalized event object is created, the normalized event object is placed on an event bus (115). In one or more embodiments of the invention, the event bus (115) is a queue. Normalized event objects are placed on the event bus (115) by multiple concurrent event publisher threads (see FIG. 2) and removed from the event bus (115) by multiple concurrent event subscriber threads (see FIG. 3) to increase throughput. Once a normalized event object has reached the front of the queue (i.e. event bus (115)), the normalized event object is taken off the queue by the next available event subscriber thread and passed to the data transformation layer (120).

In one embodiment, once the normalized event object is passed to the data transformation layer (120), the contents of the normalized event object are coupled with one or more target channel protocols (not shown), which correspond to target channels that are determined by the channel registry (125). In one or more embodiments of the invention, the channel registry (125) returns all target channels (e.g., target channel 1 (155), target channel n (160)) related to the change in identity data (i.e., target channels that need to be updated). Using the example above, if a user's middle initial were updated, the channel registry (125) would find and return all target channels (e.g., target channel 1 (155), target channel n (160)) which contained a field for the user's middle initial so that the user's middle initial is consistently updated across all channels in the application.

When a normalized event object is coupled with a target channel protocol in the data transformation layer (120), a target-specific change object (not shown) is created. In one or more embodiments of the invention, a target-specific change object contains all of the information required for committing a change in identity data to a target channel (e.g., target channel 1 (155), target channel n (160)). Once created, the target-specific change object is sent to a channel adaptation module (130), which completes the actual persistent transaction related to the change in identity data on a target channel (e.g., target channel 1 (155), target channel n (160)).

The channel administration module (140) is used by administrators to configure and control the identity synchronization framework. For example, an administrator can use the channel administration module (140) to start or stop the system, add a new channel, remove a new channel, change the number of threads operating on the event bus, etc. In one or more embodiments of the invention, the channel administration module (140) is a user interface, which may be a graphical user interface, command line interface, or some other type of user interface.

Figure 2:
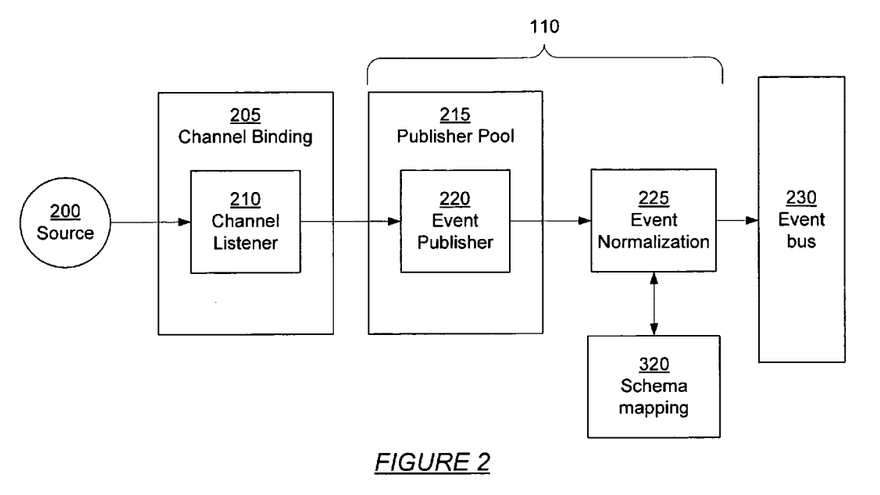

FIG. 2 shows a schematic diagram of a system for event publishing in accordance with one or more embodiments of the invention. In one or more embodiments of the invention, event publishing relates to the process of converting source-specific identity data into a normalized event object and placing it on an event bus.

As shown in FIG. 2, the system includes a source (200), a channel binding module (205), a channel listener thread (210), a publisher pool (215), an event publisher thread (220), an event normalization module (225), a schema mapping (320), and an event bus (230). Identity data originates from the source (200), which corresponds to a source channel of FIG. 1. The normalization layer (110) of FIG. 1 corresponds to the publisher pool (215), event publisher thread (220), event normalization module (225), and schema mapping (320).

In one or more embodiments of the invention, a channel listener thread (210) picks up identity data from the source (200). As stated above, each source is assigned a channel listener thread (210), which detects and transmits changes in identity data to the identity synchronization system. The channel binding module (205) houses and manages all channel listener threads (210) and is responsible for tasks such as initializing, destroying, starting, and stopping each channel listener thread (210).

In one embodiment of the invention, an event publisher thread (220) uses the event normalization module (225) to convert identity data from the source (200) into a normalized event object. The event normalization module (225) refers to one or more schema mappings (320) to convert the protocol-specific identity data from the source (200) into a generic, protocol-agnostic normalized event object. In one or more embodiments of the invention, schema mappings (320) relate fields in various protocols (e.g. LDAP, TCP/IP, RDBMS, etc.) to generic internalized representations of those fields. For example, a schema mapping (320) for a user's middle initial may relate the generic internalized representation of a middle initial field to one or more protocols containing fields for middle initials. Incoming protocol-specific identity data from a source (200) that specifies a middle initial field would then be converted to the generic internalized representation of the middle initial field based on the schema mapping (320).

Event publisher threads (220) reside in a publisher pool (215). In one or more embodiments of the invention, event publisher threads (220) are created and stored in the publisher pool (215) until the event publisher threads are dispatched to work on a change received by a channel listener thread (210). Once a normalized event object is created, the event publisher thread (220) places event object on the event bus (230) and returns to the publisher pool (215). In one or more embodiments of the invention, if an event bus is full (i.e., the event bus cannot store any additional normalized event objects), a new one is created to handle more normalized event object insertions.

Figure 3:
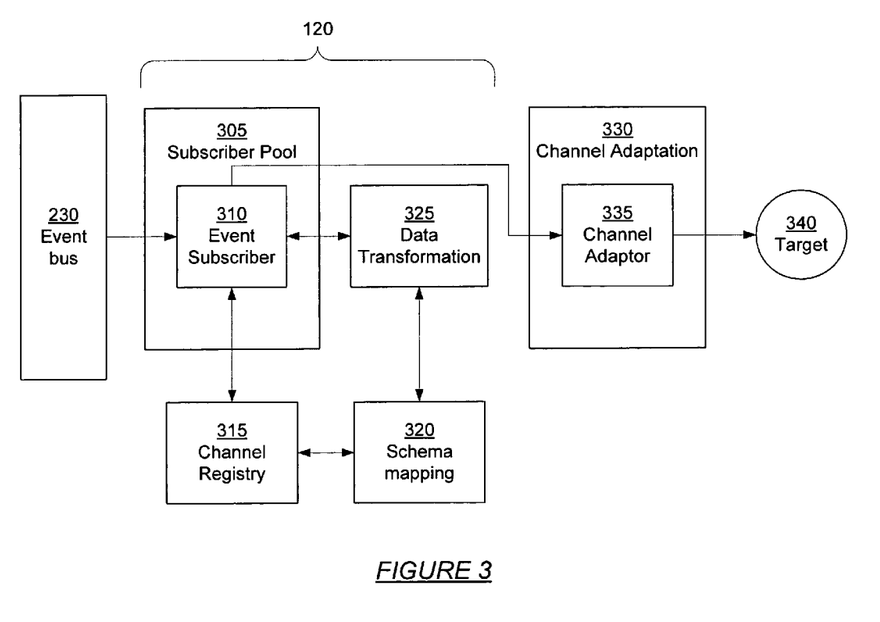

FIG. 3 shows a schematic diagram of a system for event subscription in accordance with one or more embodiments of the invention. In one or more embodiments of the invention, event subscription corresponds to the process of removing a normalized event object from an event bus, determining the targets that receive the change contained in the normalized event object, converting the normalized event object into target-specific change objects, and committing the target-specific change objects to persistence on one or more targets.

FIG. 3 includes an event bus (230), a subscriber pool (305), an event subscriber thread (310), a channel registry (315), a schema mapping (320), a data transformation module (325), a channel adaptation module (330), a channel adaptor thread (335), and a target (340). Target-specific change objects contain changes that are committed to targets (340), which are synonymous with target channels of FIG. 1. The data transformation layer (120) of FIG. 1 corresponds to the subscriber pool (305), event subscriber thread (310), data transformation module (325), and schema mapping (320).

As described above, the event bus (230) contains one or more normalized event objects, which are placed on the event bus (230) by one or more event publisher threads. As shown in FIG. 3, normalized event objects are removed from the event bus (230) using one or more event subscriber threads (310), which reside in a subscriber pool (305). In one or more embodiments of the invention, event subscriber threads (310) are created and stored in the subscriber pool (305) until they are sent to retrieve normalized event objects from the event bus (230). Once an event subscriber thread (310) is finished executing, the event subscriber thread (310) returns to the subscriber pool (305).

Once an event subscriber thread (310) has retrieved a normalized event object from the event bus (230), the event subscriber thread (310) checks the channel registry (315) for a list of targets (340) that should receive the change. The channel registry (315) then refers to one or more schema mappings (320) to compile a list of targets that the normalized event object is relevant to. As stated above, in one or more embodiments of the invention, a schema mapping (320) includes the relationship between analogous identity data fields in different channels, and the channel registry (315) contains logic to pick targets relevant to the change based on the schema mapping (320). The schema mapping (320) may be implemented using a variety of means, such as XML or with a data structure such as a tree or linked list. For example, an XML schema mapping (320) that relates fields for a user's middle initial to an Oracle® database (Oracle is a registered trademark of the Oracle Corporation) and an LDAP directory server may look like the following:

```
<GenericField name="middleInitial">
  <Channel>
    <ChannelProtocol>Oracle</ChannelProtocol>
    <ChannelField>user.MI</ChannelField>
    <ChannelFieldType>char</ChannelFieldType>
  </Channel>
  <Channel>
    <ChannelProtocol>LDAP1</ChannelProtocol>
    <ChannelField>userMiddleInitial</ChannelField>
    <ChannelFieldType>
      ces case exact string
    </ChannelFieldType>
  </Channel>
</GenericField>
```

Those skilled in the art will appreciate that schema mappings (320) may be implemented using a variety of relationships and structures. For example, a schema mapping may list a set of target channel attributes that correspond to a source channel attribute, or the schema mapping may convert a source channel attribute into a generic field and list all target channels that contain that field. A schema mapping may or may not differentiate between sources and targets; identity data arising from one channel may be simply propagated to all other channels containing relevant entries for the identity data. A schema mapping may correspond to one source or target, or more than one source or target. As a result, the system may contain multiple schema mappings. For example, there may be a schema mapping from each source to multiple targets, from multiple sources to a target, from an internalized generic field to multiple channels, etc.

In one or more embodiments of the invention, the channel registry (315) accomplishes data transformation on the normalized event object to create target-specific change objects when multiple targets (340) corresponding to a source are found. Alternately, the channel registry (315) or event subscriber thread (310) may pass the list of targets and the normalized event object to the data transformation module (325), which directly accesses the schema mappings (320) to create target-specific change objects from the normalized event object. In one or more embodiments of the invention, the schema mappings (320) are used both to determine the targets (340) that pertain to the identity data arising from the source and to create target-specific change objects by converting the generic identity data fields in the normalized event object into protocol-specific identity data fields for each target (340).

Once the target-specific change objects are created, the channel registry (315) or data transformation module (325) passes the target-specific change objects back to the event subscriber thread (310), which sends the target-specific change objects to one or more channel adaptor threads (335). In one or more embodiments of the invention, channel adaptor threads (335) are responsible for committing changes to persistence on each target (340). In one or more embodiments of the invention, channel adaptor threads (335) are target-specific and can be run on the client side or server side. In other words, server-side channel adaptor threads (335) reside on and consume the resources of the identity synchronization framework, whereas client-side channel adaptor threads (335) reside on and utilize the resources of the systems hosting the targets (340).

Channel adaptors (335) are stored on and managed by a channel adaptation module (330), which is responsible for the initialization, destruction, starting, and stopping of each channel adaptor thread (210). Once a channel adaptor (335) receives a target-specific change object, the channel adaptor (335) applies the change to the target (340).

If only one target (340) corresponding to the normalized event object is found, the data transformation (325) may be performed by the event subscriber thread (310). In this embodiment of the invention, the channel registry (315) returns the target (340) as well as the relevant schema mapping (320) so that the event subscriber thread (310) can perform the data transformation (325). Alternately, the event subscriber thread (310) may pass the target to the data transformation module (325), which obtains the relevant schema mapping (320) and converts the normalized event object into a target-specific change object.

Figure 4:
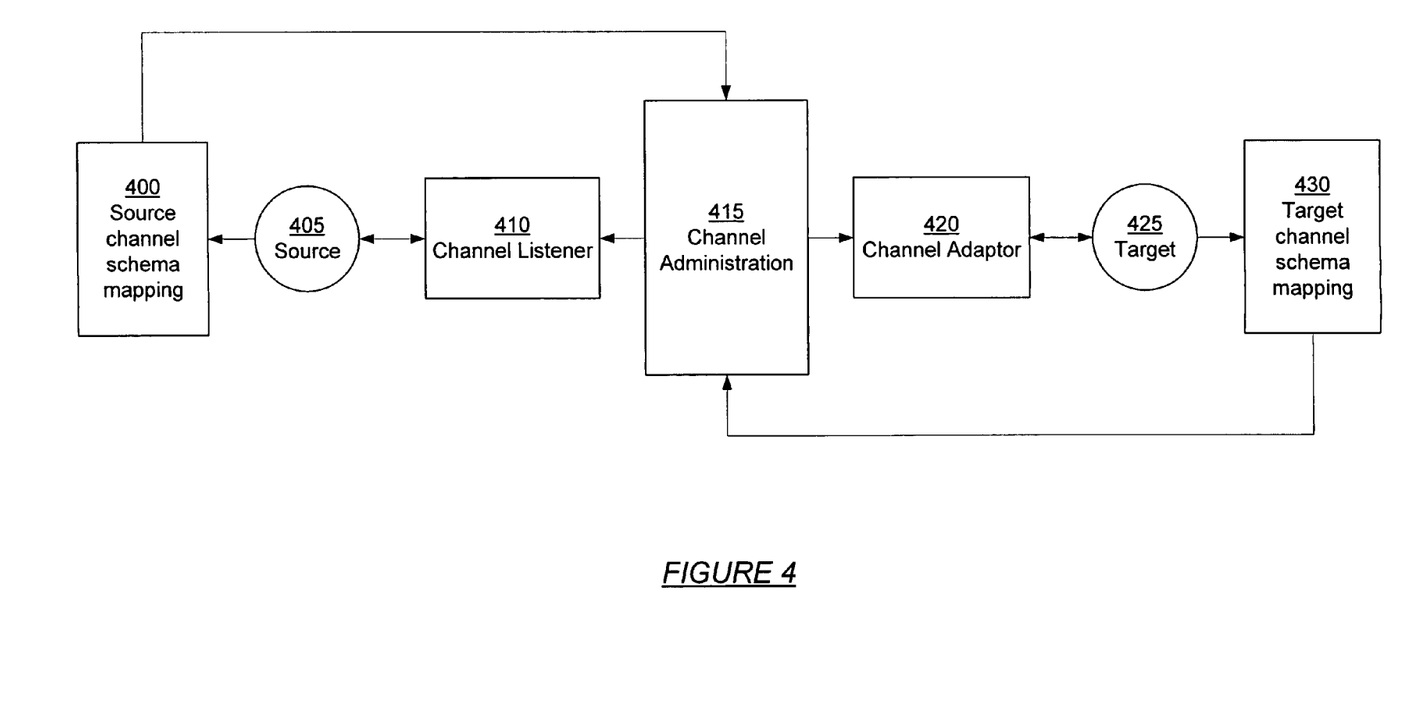

FIG. 4 shows a schematic diagram of a system for channel administration in accordance with one or more embodiments. As stated above, channel administration is associated with the creation, configuration, and deletion of channels as well as the general management of the identity synchronization framework. As shown in FIG. 4, a channel administration system interfaces with a source channel schema mapping (400), a source (405), a channel listener (410), a channel administration module (415), a channel adaptor (420), a target (425), and a target channel schema mapping (430).

As described above, the channel administration module (415) is used to configure and manage the identity synchronization framework. In one or more embodiments of the invention, the channel administration module (415) is a type of user interface that may be accessed by administrators to perform tasks such as adding new channels, removing channels, configuring schema mappings, setting the normalization rate, changing the size of subscriber pools and publisher pools, etc.

When a new source (405) is added, the channel administration module (415) must also add a new channel listener (410) dedicated to that source (405). As stated above, the channel listener (410) is responsible for detecting identity information changes in the assigned source (405). Similarly, when a new target (425) is added, a new channel adaptor (420) must be created to commit changes to the target (425) in accordance with one or more embodiments of the invention.

In one or more embodiments of the invention, the channel administration module (415) is also responsible for configuring channel listener threads (410) and channel adaptor threads (420). For example, the channel administration module (415) must specify the protocol of the channel (e.g., source (405), target (425)) that corresponds to a channel listener thread (410) or a channel adaptor thread (420). The channel administration module (415) may also specify the fields that trigger a change notification. For example, identity data that is stored exclusively on one channel does not require a change notification, whereas data that is distributed among multiple channels does. A common field such as a user's middle initial is likely to be on many channels, whereas an uncommon field such as a password reset question for a login screen may exist on only one channel.

When a new channel is added, the administrator creates a new schema mapping (e.g., source channel schema mapping (400), target channel schema mapping (430)) for the channel via the channel administration module (415). As stated above, a schema mapping links channels together by identifying analogous or related fields between channel protocols. In one or more embodiments of the invention, when a source channel (405) is added, the channel administration module (415) must create a new source channel schema mapping (400) for the source channel (405) so that the data transformation layer can access the source channel schema mapping (400), determine what targets (425) pertain to a change in the source channel (405), and create target-specific change objects based on the targets and schema mappings.

Similarly, when a target channel (425) is added, the channel administration module (415) must create a new target channel schema mapping (430) for the target channel (425), which can be used by the data transformation layer to map changes to the relevant targets (425) and create target-specific change objects to be forwarded to those targets (425). In one or more embodiments of the invention, schema mappings are created by an administrator via the channel administration module (415). When a new channel is added, the administrator determines how the fields in that channel, which correspond to a specific channel protocol, relate to fields in other channels, which correspond to different channel protocols. In one or more embodiments of the invention, schema mappings (e.g., source channel schema mapping (400), target channel schema mapping (430)) created from the addition of new channels are incorporated into the schema mappings of FIGS. 2 and 3.

Those skilled in the art will appreciate that a channel may be both a source channel and a target channel, and that based on the structure of the schema mappings, both a source channel schema mapping (400) and a target channel schema mapping (430) may be added with the channel. In addition, those skilled in the art will appreciate that numerous methods exist for implementing schema mappings between different protocols, which influences the creation of schema mappings based on new protocol. For example, a new schema mapping may be created for a new channel, or a schema mapping may be created for every identity attribute in a channel.

Figure 5:
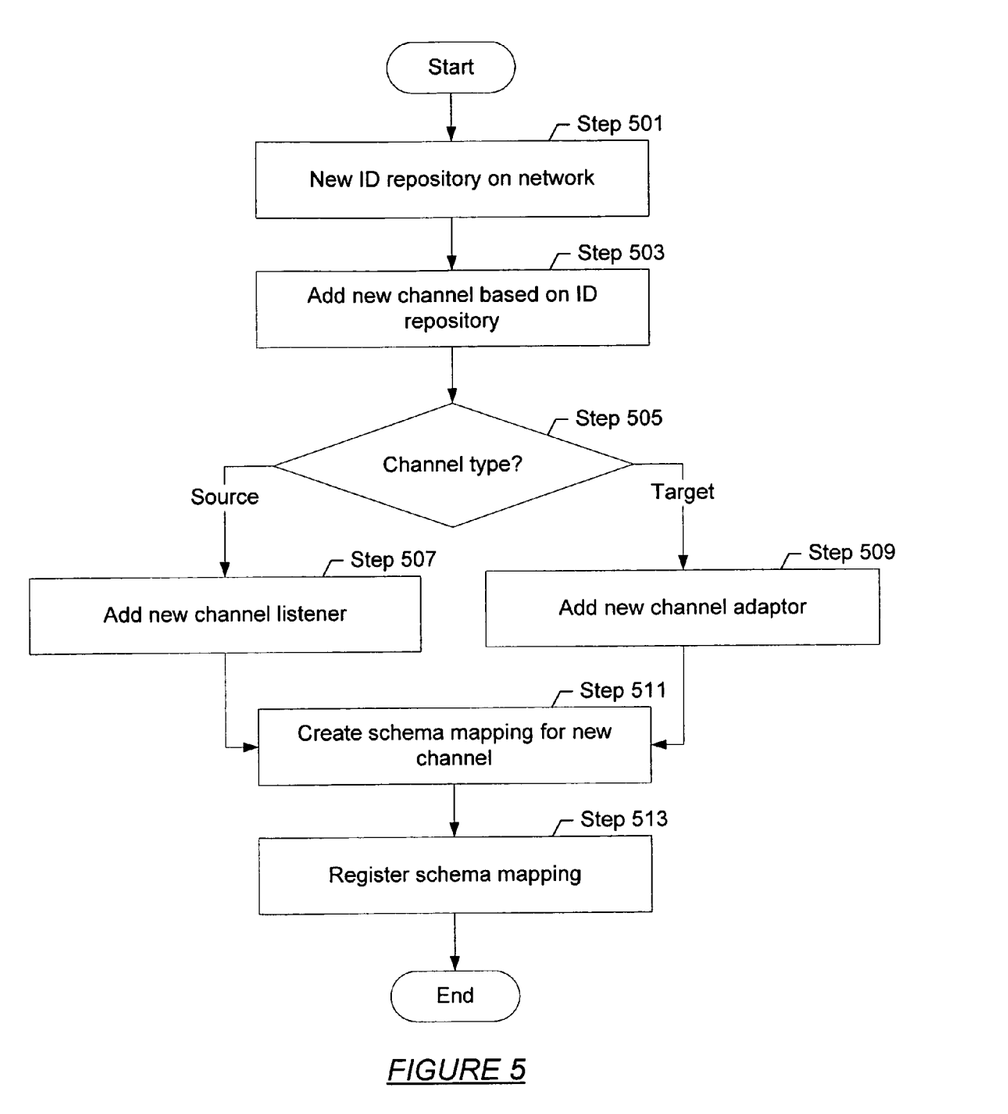
FIGS. 5-6 show flow diagrams in accordance with one or more embodiments of the invention.

FIG. 5 shows a flowchart for adding and configuring a new channel in accordance with one or more embodiments of the invention. Initially, a new ID repository is added to the network (Step 501). A new ID repository may be added when a new service or feature is implemented, or to handle an expanding user base. As stated above, an ID repository may be an LDAP directory server, a relational database, a web access management tool, etc.

Once a new ID repository is added to the network (Step 501), a new channel is created for the ID repository and added to the identity synchronization system (Step 503). As stated above, in one or more embodiments of the invention, an ID repository is modeled as a channel within the system. Once the channel is created, a determination is made whether the channel is a source channel or a target channel (Step 505).

If the channel is a source channel, a new channel listener is added (Step 507) in accordance with one or more embodiments of the invention. Alternately, if the channel is a target channel, a new channel adaptor is added (Step 509). As stated above, a channel may be both a source channel and a target channel. If the channel is both a source and a target, then both a channel listener and a channel adaptor are added for the channel. A channel listener is responsible for detecting identity data changes in a source channel, and a channel adaptor is responsible for committing synchronization-related identity data changes to a target channel.

Next, a schema mapping is created for the new channel (Step 511). As stated above, an arbitrary number of schema mappings may be created for a new channel. For example, because a channel may be both a source and a target, both a source channel schema mapping and a target channel schema mapping may be created. After the schema mapping for a new channel is created (Step 511), the schema mapping is registered (513). As stated above, schema mapping registration may be accomplished via the channel administration module.

Figure 6:
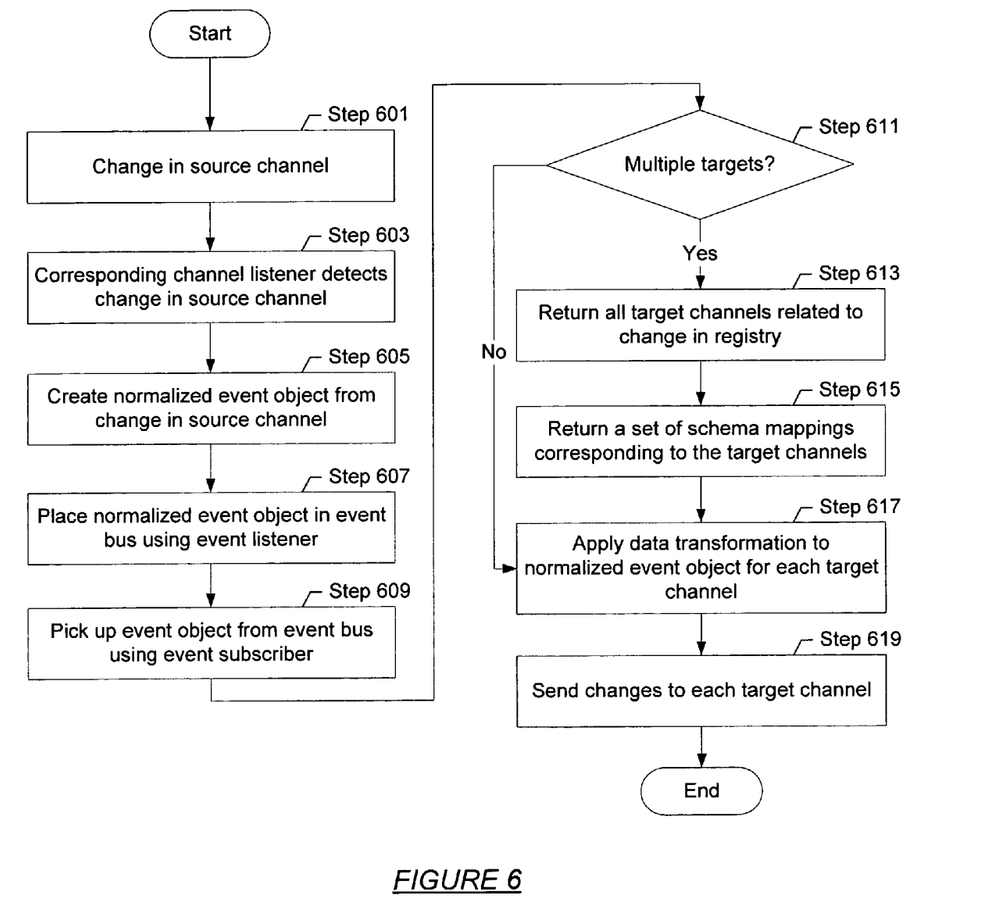

FIG. 6 shows a flowchart of an identity synchronization process in accordance with one or more embodiments of the invention. Specifically, FIG. 6 illustrates how a change originating from a source channel is propagated to one or more target channels through an identity synchronization framework in accordance with one or more embodiments of the invention.

First, a change in a source channel occurs (Step 601). For example, a change in a source channel may occur when a user adds a new account, updates his/her account information, or deletes an account. In one or more embodiments of the invention, the change in the source channel is associated with one or more identity attributes bound to the source channel protocol that have been altered.

Once a change has occurred in a source channel (Step 601), the change is detected by the corresponding channel listener (Step 603). The channel listener then extracts the data relevant to the change and forwards the data to an event publisher, which passes it through an event normalization module to create a normalized event object (Step 605). The event listener then places the normalized event object onto the event bus (Step 607), where the normalized event object remains until an event subscriber removes it from the event bus (Step 609).

Once the normalized event object has been removed from the event bus, the normalized event object is converted into a format that can be transmitted to a target channel. First, a check is made to determine whether there are multiple targets that need to be updated with the information in the normalized event object (Step 611). In one or more embodiments of the invention, the check for multiple targets is accomplished by the channel registry using the schema mapping. Alternately, the event subscriber may check the schema mappings itself to generate a list of targets that need to receive the change. If only one target is found, data transformation is applied to the normalized event object (Step 617) to create a target-specific change object, which is then transmitted to the target channel (Step 619) via a channel adaptor thread to commit the change to the target channel. As stated above, data transformation for a single target may be performed by the data transformation module, channel registry, or event subscriber thread.

If multiple targets corresponding to the change are found, the registry returns all target channels related to the change (Step 613), as well as a set of schema mappings related to the target channels (Step 615). The target channels and schema mappings are received by the event subscriber, which may then apply data transformation to the normalized event object (Step 617) to create target-specific change objects itself. Alternately, the event subscriber may forward the normalized event object, target channels, and schema mappings to the data transformation module, where target-specific change objects are created and returned back to the event subscriber for forwarding to one or more channel adaptor threads. Once a channel adaptor thread receives a target-specific change object, the channel adaptor thread applies the change to the corresponding target channel (Step 619).

Figure 7:
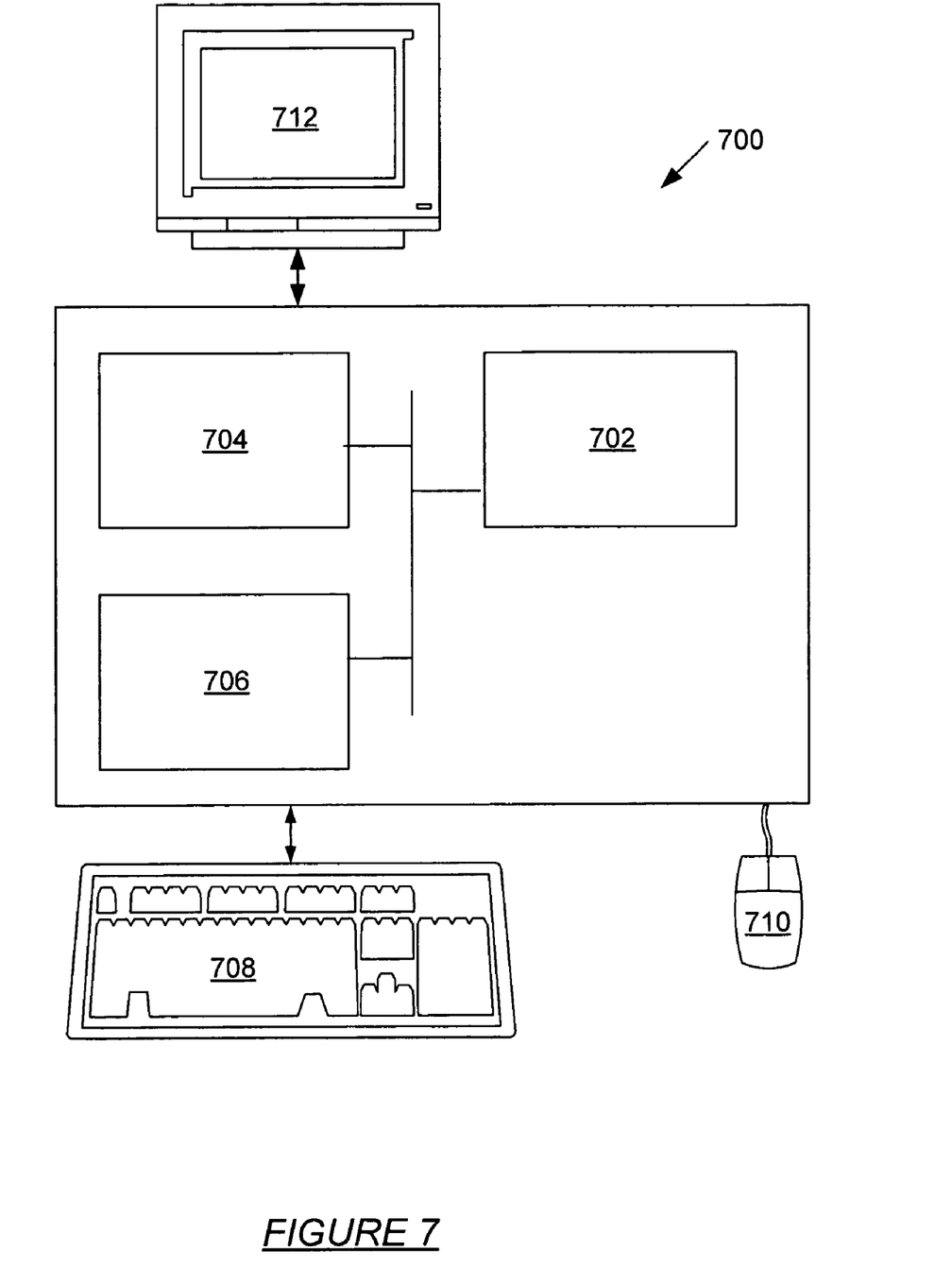
FIG. 7 shows a computer system in accordance with one or more embodiments of the invention.

The invention may be implemented on virtually any type of computer regardless of the platform being used. For example, as shown in FIG. 7, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., source channels, event bus, target channels, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identity synchronization across multiple domains, comprising:
    detecting a change in identity data stored in a source channel;
    obtaining changed identity data from the source channel, wherein the changed identity data is associated with a source channel protocol;
    decoupling the changed identity data from the source channel protocol to obtain decoupled identity data;
    creating a normalized event object using the decoupled identity data, wherein the normalized event object comprises a normalized change type, a normalized changed field, and a normalized changed value;
    placing the normalized event object into an event bus;
    identifying, using a channel registry, a target channel from a plurality of channels to forward the normalized event object, wherein identifying the target channel comprises for each of the plurality of channels:
        determining whether a schema mapping defined for a channel comprises the normalized changed field, wherein the schema mapping is stored in the channel registry; and
        setting the channel as the target channel when the schema mapping comprises the normalized changed field;
    coupling, using the schema mapping, the normalized event object with a target channel protocol to create a target-specific change object for the target channel; and
    forwarding the target-specific change object to the target channel.

2. The method of claim 1, wherein the schema mapping is stored using an extensible markup language (XML) schema.

3. The method of claim 1, wherein the normalized event object is placed into the event bus using an event publisher thread and wherein the normalized event object is removed from the event bus using an event subscriber thread.

4. The method of claim 3, wherein the event publisher thread is dispatched from a publisher pool and the event subscriber thread is dispatched from a subscriber pool.

5. The method of claim 1, wherein the changed identity data is obtained from the source channel using a channel listener thread, and wherein the target-specific change object is forwarded to a target channel using a channel adaptor thread.

6. A system for synchronizing identities across multiple domains, comprising:
    a source channel, wherein the source channel is associated with a source channel protocol;
    a listener thread associated with the source channel and configured to detect a change in identify data stored in the source channel;
    a plurality of channels, wherein each of the plurality of channels is associated with a target channel protocol;
    a normalization layer configured to:
        decouple changed identity data from the source channel protocol; and
        create normalized event objects using the decoupled identity data, wherein the normalized event object comprises a normalized change type, a normalized changed field, and a normalized changed value;
    an event bus configured to store the normalized event objects created by the normalization layer; and
    a data transformation layer configured, using a channel registry, to:
    identify, using the channel registry, a target channel from the plurality of channels to forward the normalized event object, wherein identifying the target channel comprises for each of the plurality of channels:
        determining whether a schema mapping defined for a channel comprises the normalized changed field, wherein the schema mapping is stored in a channel registry; and
        setting the channel as a target channel when the schema mapping comprises the normalized changed field; and
    couple decoupled identity data in the normalized event objects with the target channel protocols.

7. The system of claim 6, wherein the schema mapping is stored using an extensible markup language (XML) schema.

8. The system of claim 7, further comprising:
    a channel binding module comprising a channel listener thread configured to obtain the changed identity data from the source channel; and
    a channel adaptation module comprising a channel adaptor thread configured to forward a target-specific change object based on the changed identity data to the target channels.

9. The system of claim 6, further comprising a channel administration module configured to:
    create source channels corresponding to new source repositories;
    create target channels corresponding to new target repositories; and
    create schema mappings between source channel protocols and target channel protocols.

10. The system of claim 9, wherein the channel administration module is further configured to:
    create channel listeners to obtain the changed identity data from source channels corresponding to source repositories; and
    create channel adaptors to forward target-specific change objects to target channels corresponding to target repositories.

11. A non-transitory computer readable medium having computer readable program code embodied therein for causing a computer system for executing a method for identity synchronization across multiple domains, comprising:
    detecting a change in identity data stored in a source channel of a plurality of channels;
    obtaining changed identity data from the source channel, wherein the changed identity data is associated with a source channel protocol;
    decoupling the changed identity data from the source channel protocol to obtain decoupled identity data;
    creating a normalized event object using the decoupled identity data, wherein the normalized event object comprises a normalized change type, a normalized changed field, and
    a normalized changed value; placing the normalized event object into an event bus;
    identifying, using a channel registry, a target channel from the plurality of channels to forward the normalized event object, wherein identifying the target channel comprises for each of the plurality of channels:

determining whether a schema mapping defined for a channel comprises the normalized changed field, wherein the schema mapping is stored in the channel registry; and setting the channel as the target channel when the schema mapping comprises the normalized changed field;

coupling the normalized event object with a target channel protocol to create a target-specific change object for the target channel; and forwarding the target-specific change object to the target channel.

12. The non-transitory computer readable medium of claim 11, wherein the schema mapping is mappings are stored using an XML schema.

13. The non-transitory computer readable medium of claim 11, further comprising:

placing the normalized event object into the event bus using an event publisher thread; and picking up the normalized event object from the event bus using an event subscriber thread.

14. The non-transitory computer readable medium of claim 13, wherein the event publisher thread is dispatched from a publisher pool and the event subscriber thread is dispatched from a subscriber pool.

15. The non-transitory computer readable medium of claim 11, wherein the changed identity data is obtained from the source channel using a channel listener thread, and wherein the target-specific change object is forwarded to a target channel using a channel adaptor thread.

* * * * *

UNITED STATES PATENT AND TRADEMARK OFFICE
CERTIFICATE OF CORRECTION

PATENT NO. : 7,702,747 B1
APPLICATION NO. : 11/444552
DATED : April 20, 2010
INVENTOR(S) : Lei Liu et al.

It is certified that error appears in the above-identified patent and that said Letters Patent is hereby corrected as shown below:

In Claim 12, column 13, line 14, please delete "mappings are".

Signed and Sealed this

Seventeenth Day of August, 2010

David J. Kappos
*Director of the United States Patent and Trademark Office*